United States Patent [19]

Ismail

[11] 3,723,172
[45] Mar. 27, 1973

[54] CHEMICAL AND THERMAL STABILITIES AND FIRE RESISTANCE OF SYNTHETIC RESINOUS BODIES

[75] Inventor: Roshdy Ismail, Neunkirchen, Germany

[73] Assignee: Dynamit Nobel AG, Troisdorf, Germany

[22] Filed: Sept. 18, 1970

[21] Appl. No.: 73,672

[30] Foreign Application Priority Data

Sept. 20, 1969 Germany..................P 19 47 807.0

[52] U.S. Cl..............................117/138.8 A, 117/138.8 E, 117/138.8 F, 117/138.8 N, 117/138.8 UA, 117/161 UB, 156/306, 161/184, 161/190, 161/231, 161/403
[51] Int. Cl............................B44d 1/09, B32b 27/08
[58] Field of Search ........260/47, 869; 156/293, 306, 156/309, 278; 161/403, 252, 254, 231, 184, 190; 117/138.8 A, 138.8 E, 138.8 F, 138.8 N, 138.8 UA, 161 UB

[56] References Cited

UNITED STATES PATENTS

| 3,194,725 | 7/1965 | Pounds | 161/403 X |
|---|---|---|---|
| 3,160,602 | 12/1964 | Kantor et al. | 260/47 C |
| 3,189,513 | 6/1965 | Calderwood et al. | 161/403 X |
| 3,444,023 | 5/1969 | Shockey | 156/293 |
| 3,041,707 | 7/1962 | Perri | 161/403 X |
| 3,234,168 | 2/1966 | Hare | 260/47 C |
| 2,783,215 | 2/1957 | Robitschek | 161/403 X |
| 3,234,167 | 2/1966 | Sweeny | 260/47 C |

*Primary Examiner*—William J. Van Balen
*Attorney*—Burgess, Dinklage & Sprung

[57] ABSTRACT

Synthetic resinous bodies especially in sheet form, such as plates, foils, webs and non-wovens, have their chemical and thermal stabilities and their fire resistance improved by application thereto of a polyester of an aromatic dicarboxylic acid, such as terephthalic acid optionally admixed with isophthalic acid, and a halogenated dihydric phenol which may be mixed with up to an equal mole percent of a halogen-free dihydric phenol. The synthetic resinous material may be a crude pre-form wrapped in a sheet of the polyester and formed into final shape with heat and pressure and, optionally, curing. An epoxy resin or polyurethane adhesive may help bond the synthetic resinous material to the polyester sheet.

The synthetic resinous body may comprise a polyamide, polycarbonate, polyvinylchloride, polystyrene or polyester.

10 Claims, No Drawings

CHEMICAL AND THERMAL STABILITIES AND FIRE RESISTANCE OF SYNTHETIC RESINOUS BODIES

The present invention relates to improving the chemical and thermal stabilities and the fire resistance of synthetic resinous bodies by coating with halogenated polyesters.

There are many plastics which can be advantageously processed and molded into definite and even intricate shapes, and which often lend themselves to being spun into filaments and made into fabrics; yet in many cases the molded articles so produced are afflicted with serious drawbacks and therefore are of no use. Thus the softening range, and hence the particular temperature limit for continuous stress, of molded bodies of polyamides, polycarbonate, polyvinyl chloride, polystyrene and polyester resins, for example, is too low for many applications. These temperatures limits are about 120°C for polycarbonate, about 130°C for polyethylene terephthalate, about 105°C for polyamides, and about 90°C for polyvinyl-chloride.

In many cases the shaped articles, such as fabrics for filter media, are also exposed to solvents or chemicals. Since many plastics readily dissolve or decompose under the action of such substances, costly, heavy and difficultly processed plastics, such as polyimides or fluorocarbon plastics, must be used in their place in view of the state of the art.

In principle, the use of plastics in the construction field is also of interest. However, many plastics cannot be used in this area because of their pronounced flammability and combustibility.

The present invention has as its object a method of increasing the chemical and thermal stability and the flame resistance of bodies of plastics of low chemical and/or thermal stability and/or of combustible plastics.

This and other objects and advantages are realized in accordance with the invention wherein plastic bodies are coated with polyesters of a dicarboxylic acid such as terephthalic acid alone or in admixture with isophthalic acid and of a halogenated dihydric phenol or of mixtures of a halogenated dihydric phenol and a halogen-free dihydric phenol.

The preparation of the polyesters used in such coating, which preparation is known per se, involves the reaction of dichlorides of dicarboxylic acids, especially aromatic dicarboxylic acids and particularly phthalic acids such as terephthalic acid, or mixtures of dichlorides of terephthalic acid and isophthalic acid, especially as may contain one or two chlorine atoms on the aromatic nucleus, which mixtures may also contain dichlorides of saturated aliphatic dicarboxy-lic acids and/or esters bischloroformic acid, with dihydric phenols, and particularly halogenated dihydric phenols or mixtures of halogenated dihydric phenols and halogen-free dihydric phenols, in organic solvents, if appropriate, preferably in the presence of catalysts, at a temperature between about 50° and 250°C., with formation of by-product HCl.

The catalysts used in the preparation of the polycondensates in accordance with the invention may be tertiary amines whose amino group may or may not be a constituent of an aromatic ring system, and/or, if appropriate, N-mono or N-disubstituted acid amides. Phosphine, arsine and similar compounds also are suitable catalysts. They are used in amounts of 0.1 to 20 mole percent, referred to the acid halide. In principle, the quaternary ammonium compounds of these catalysts, and particularly the hydrochlorides or the corresponding salts of the halogenated phenols and the tertiary amines, may likewise be used.

Both mono- and polynuclear phenols may be employed as halogenated dihydric phenols for synthesis of the polyesters used in accordance with the invention. Thus, chlorinated hydroquinones such as tetrachlorohydroquinone, 2-chloro-hydroquinone, trichlorohydroquinone and 2,4,6-trichlororesorcinol are suited.

Suitable halogenated polynuclear phenols are, for example, 2,2-bis(3-chloro-4-hydroxyphenyl)propane, 2,2-bis (3,5-dichloro-4-hydroxyphenyl)propane, 2,2-bis(3,5-dibromo-4-hydroxyphenyl)-propane, 4,4'-dihydroxy-5,5'-difluorodiphenyl-methane, 1,1-bis-(3,5-dichloro-4-hydroxyphenyl)1-phenylethane, 2,2-bis(3,5-di-bromo-4-hydroxyphenyl)hexane, 4,4'-dihydroxy-3, 3', 5,5'-tetra-chlorodiphenyl and the corresponding tetra-chloroderivatives of 4,4'-dihydroxydiphenylethers, 4,4'-dihydroxybenzophenones and 4,4'-dihydroxydiphenylsulfones, 4,4'-dihydroxytetraphenylmethane, tetrachlorophenolphthalein, and the like.

Suitable halogen-free dihydric phenols are compounds of the general formula

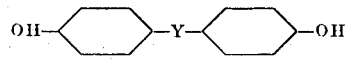

where Y has the same significance as in the halogenated phenols, i.e., it may be a saturated aliphatic hydrocarbon radical or phenyl-substituted derivative thereof, oxygen, carbonyl, sulfone, a direct connection, or the like.

Typical representatives of these phenols are the dihydroxy-diphenyls, for example, 2,2'-, 2,4'-, 4,4'-dihydroxy-diphenyl, 4,4'-dihydroxy-2-methyldiphenyl, 4,4'-dihydroxy-2,4'-dimethyldiphenyl, 4,4'-dihydroxy-3,3'-dimethyldiphenyl, 6,6'-dihydroxy-3,3'-dimethyldiphenyl, and the like; dihydroxy-benzophenones such as 2,2'-, 2,3'-, 2,4'-, 3,3'-, 3,4'-, 4,4'-, 4,6'- and 6,6'-dihydroxybenzophenone, and the like; dihydroxydiphenylsulfides such as 2,2'- and 4,4'-dihydroxydiphenylsulfide; dihydroxydiphenyl-sulfones such as 2,2'- and 4,4'-dihydroxydiphenylsulfone; dihydroxydiphenylalkanes such as 2,2'- and 4,4'-dihydroxydibenzyl; 2,2'-, 2,3'-, 2,4'-, 2,5'-, 2,6'-, 3,3'-, 3,4'-, 3,5'-, 3,6'-, 4,4'-, 4,5'-, 4,6'-, 5,5'-, 5,6'- and 6,6'-dihydroxydiphenyl-2,2-propane, 2,2'- or 4,4'-dihydroxydiphenylmethane, 4,4'-dihydroxydiphenylmethylmethane, 4,4'-dihydroxydiphenylphenylmethane, 4,4'-dihydroxydiphenyldiphenylmethane, and the like.

A suitable acid dichloride for the preparation of the polyesters which in accordance with the invention are used as a coating is particularly terephthaloyl dichloride, which includes tetrachloroterephthaloyl dichloride, for example. Suitable mixtures of acid dichlorides, in addition to isophthaloyl dichloride, include also the dichloride of saturated aliphatic dicarboxylic acids, branched and unbranched straight chain, such as the dichlorides of oxalic, malonic, succinic, glutaric, adipic, pimelic, suberic, azelaic, sebacic and itaconic acids. Moreover, esters of bis-chloroformic acid may be used as additional acid di-chlorides. Examples are the following substances: 2,2-bis(4-chloroformicacid phenylester) propane and 2,2-bis-(4-chloroformicacid-(3,5-dichlorophenyl ester)] propane. The esters of bis-chloroformic acid which may also be used in the synthesis of the polyesters in accordance with the invention may be prepared by known methods through the reaction of diphenols with phosgene in the presence of tertiary amines as catalysts. (See Makromol. Chem. 57, 1 [1962].) Preferred diphenols for the preparation of the bis-chloroformic acid esters are 2,2-bis(4-hydroxyphenyl)propane, 2,2-bis-(3-chloro-4-hydroxyphenyl)propane, 2,2-bis-(3,5-dibromo-4-hydroxyphenyl)propane, 2,2-bis-(3,5-dichloro-4-hydroxyphenyl)-propane, tetrachlorodiphenylolsulfone, 4,4'-dihydroxydi-phenyl, and the like.

In preparing the polyesters to be used in accordance with the invention, in which esters of bischloroformic acid can also be employed, it is advantageous first to condense the bischloroformate with the excess halogenated dihydric phenol or with the mixture of halogenated dihydric phenol and halogen-free dihydric phenol. This reaction does not require a catalyst and is completed after about 2 to 5 hours when the excess of dihydric phenol is sufficiently large. The terephthaloyl dichloride is then added and reacted with the free hydroxyl groups remaining in the reaction products. Here a catalyst is preferably used.

When the aforesaid catalysts are employed in the synthesis of the polyesters used in accordance with the invention, polyesters having particularly high molecular weights ranging from about 15,000 to 160,000, and preferably from about 25,000 to 120,000, will be obtained. These values were estimated on the basis of the molecular-weight distribution curve constructed by the gel-chromatographic method, using a model 200 apparatus of Waters Associates, Inc., of Framingham, Massachusetts. The reduced viscosities were measured on 0.5 weight percent solutions of the polymer in chloroform at 25°C. by the use of a falling-sphere viscosimeter. The viscosity values range from about 0.3 to 2.1, and preferably from about 0.5 to 1.5.

For the method in accordance with the invention, polyesters soluble in organic solvents and containing terephthalic acid as the principle dicarboxylic acid constituent are preferred, the terephthalic acid preferably constituting at least about 75 mole percent of the dicarboxylic acids.

A preferred embodiment of the method of the invention is the impregnation of the combustible plastic bodies with the polyester solution, that is to say, the wetting of the bodies with these solutions followed by drying.

In most cases, the polyesters used in accordance with the invention to cover the bodies to be modified are prepared in solution. Otherwise the particular polyester is dissolved after the synthesis. Preferred are the following solvents: aliphatic or aromatic hydrocarbons, simple or cyclic ethers, halogenated hydrocarbons, and the like. The concentration of the solution is advantageously between about 0.5 and 10 weight percent, referred to the solution.

The polyester solution is applied by brushing the plastic bodies, by spraying the solutions onto the plastic bodies or by dipping the latter in the polyester solutions. In the case of coating sheet materials such as fabrics, nonwovens and the like, coating machines with suitable doctor blades are advantageously used.

The bodies so wetted are preferably dried in drying chambers or tunnel dryers and at elevated temperature.

The thickness of the layer may be varied as desired. It is dependent on the concentration of the solution. However, it may be increased simply by applying several layers.

In the method of the invention, the procedure may also be such, particularly in the case of cross-linkable plastics, that initially a roughly pre-formed body of the partially cross-linked plastic is covered with or wrapped in a foil of the particular polyester of preferably halogenated dihydric phenols or mixtures of dihydric phenols and acid dichlorides, and the blank so covered is finally shaped and fully cured in a heated press, for example. This procedure may be followed in the modification of bodies of unsaturated polyester resins, epoxy resins and diene-rubber mixtures, for example. The polyester foil used must first be produced by applying a solution of the polyesters to a substrate and then evaporating the solvent.

In similar manner, polyester foils essentially produced beforehand may also be used to overlay bodies of theremoplastics which have low chemical and/or thermal stability and/or are combustible. However, the foil-covered body must then be heated in the press to such temperature that the plastic core softens and bonding with the foil is achieved.

When a polyester foil is used for overlaying, the use of adhesives or primers may occasionally be necessary or advisable in the case of bodies of both thermoplastics and cross-linkable plastics. Particularly suitable are epoxy resins and polyurethane adhesives. A suitable primer is triphenyl-methane-4,4',4''-triisocyanate, for example. The adhesive or primer solution is applied to the surfaces of foil and plastic body to be bonded, and the solvent is then evaporated. Often it will suffice to treat only one of the surfaces, for example, that of the plastic body.

The properties of bodies of plastics which in themselves have little stability and are combustible are radically improved by the method of the invention. Especially bodies with a large surface area, such as filaments, fabrics and non-wovens, can be used, after treatment in accordance with the invention, even where the untreated bodies could not be used at all. Thus, polystyrene filter cloths, for example, which have undergone surface modification in accordance with the invention can readily be used for the filtration of mixtures of substances containing solvents that will dissolve polystyrene, as, for example, aromatic hydrocarbons. After being coated with polyesters of preferably chlorinated dihydric phenols and acid dichlorides, the filter cloth will be highly resistant to such solvents.

Fabrics of polyethylene terephthalate or polyamides coated in accordance with the invention with polyesters may, because of their flame resistance, readily be used in theaters or motion-picture houses for decoration.

Another substantial advantage of the bodies covered in accordance with the invention, particularly fabrics, nonwovens and the like, is that they are soil-repellent. This is also of importance in the case of wet and dry filters as it facilitates cleaning. Drapes remain dust-free longer.

The invention also extends to the plastic bodies, particularly foils, ribbons, filaments, fabrics, nonwovens and the like, which have low chemical and/or thermal stability and are combustible, and which are coated with polyesters of halogenated dihydric phenols or of mixtures of such halo-genated dihydric phenols and non-halogenated dihydric phenols and acid dichlorides, preferably terephthaloyl dichloride, either alone or in admixture with isophthaloyl dichloride.

The invention will be further described in the following illustrative examples.

EXAMPLE 1 a. Preparation of polyester

In a three-necked flask provided with agitator, cooler and inlet tube, 73.6 g of 2,2-bis-(3,5-dichloro-4-hydroxyphenyl)propane, 20.3 g of tereph-thaloyl dichloride and 20.3 g of isophthaloyl dichloride were dissolved in 500 ml of o-dichlorobenzene and the resulting solution mixed with 0.5 ml of quinoline. The reaction mixture was heated, with agitation, to the boiling temperature of the o-dichlorobenzene. After 36 hours' boiling, the theoretical amount of HCl was split off. The polyester so produced (yield, 95 g; reduced viscosity, 1.4, measured on an 0.5 weight percent solution in chloroform) was precipitated with methanol, filtered, and dissolved in about 1 liter of chloroform. (Reduced viscosity $\eta_{red} = \eta_{sp/c}$ $$\eta \text{ sp} = (\eta/\eta_0) - 1;$$

$\eta =$ viscosity of the solution,
$\eta_o =$ viscosity of the solvent)

b. Covering a polycarbonate plate

A plate of polycarbonate having a reduced viscosity of 0.5 (as measured on an 0.5 weight percent solution in chloroform at 25°C) and the dimensions 20 × 10 × 1 mm was coated with the polyester solution. After drying for 1 hr. at 100°C, a uniform film 15$\mu$ thick was obtained which adhered firmly to the plate. It was thermostable and noncombustible and did not become detached even after the coated plate had been boiled in water for 8 hours.

EXAMPLE 2

A plate 1 mm thick of polyamide based on terephthalic acid and 2,2,4-trimethylhexamethylenediamine having a relative viscosity of 2.5 (as measured in phenol tetrachloroethane, 60:40) was coated with a 10 percent solution of the polyester used in Example 1. After drying at 100°C, a film 15$\mu$ thick was obtained. This thermostable, noncombustible film was found to adhere even after boiling in water for 8 hours.

EXAMPLE 3

The same procedure was followed as in Example 1, except that a 5 mm thick hard polyvinylchloride plate was used. The polyvinylchloride had a K value of 60 to 65. (The K value is a measure of the molecular weight of a high polymer. It is a constant in Fikentscher's law, described in the periodical Cellulosechemie 13, [1932], 60, for example.) The film so produced firmly adhered even after immersion in water for 48 hours.

EXAMPLE 4 a. Preparation of polyester

In the apparatus employed in Example 1 (a), 13.7 g of 2,2-bis-(4-hydroxyphenyl)propane and 40.6 g of terephthaloyl dichloride were dissolved in 500 ml of o-dichlorobenzene and the resulting solution mixed with 0.5 ml of quinoline. The reaction mixture was heated, with agitation, to the boiling point of the o-dichlorobenzene. After boiling for 3 hours, 30 mole percent of the theoretical amount of hydrochloric acid was split off, and 51.2 g of 2,2-bis-(3,5-dichloro-4-hydroxyphenyl)propane was added. After another 30 hours the reaction was completed.

b. Coating a plastic foil

A foil 260 $\mu$ thick of a copolymer of vinyl chloride and vinyl acetate (mole ratio, 87:13) with a K value of 50 to 56 was coated on both sides with the polyester solution by dipping the foil into the solution and then drying it (1 hour at 70°C). The firmly adhering protective layer was 50$\mu$ thick on either side. It could be detached from the substrate only with difficulty even when subjected to high mechanical stresses (by flexing, for example).

A similar foil of a copolymer of vinyl chloride and maleic anhydride (mole ratio, 80:20) was coated with the polyester in the same manner. The result was a composite exhibiting the same stability.

EXAMPLE 5

A plate 1 mm thick of polycarbonate in accordance with Example 1 was treated as in that example with a blend of two polyester solutions (each a 10 weight percent solution in chloroform). One of the two polyesters corresponded to that produced in accordance with Example 1 (a). The second polyester differed from the first in that bis-(4-hydroxyphenyl) propane had been used in the synthesis in place of 2,2-bis-(3,5-dichloro-4-hydroxyphenyl)propane.

After treatment, the polycarbonate plate was protected by a layer of polyester 40$\mu$ thick which withstood boiling in water for 8 hours and continued to adhere firmly to the plate. The same result was obtained when the plate was coated with a 40$\mu$ polyester film and pressed for 3 minutes in a press at 210°C and 150 kilopounds/cm².

EXAMPLE 6

A plate 2 mm thick of soft polyvinylchloride (containing 70 parts by weight of suspension polyvinylchloride with a K value of 70 and 30 parts by weight of dioctyl phthalate) was coated with a 10 percent polyester solution in accordance with Example 1 (reduced viscosity = 1.4). After drying in warm air for 2 hours, a plate protected by a 25$\mu$ thick layer of polyester was obtained.

EXAMPLE 7

A thick 2.5 mm thick of epoxy resin based on 2,2-bis-(4-hydroxyphenyl)propane and epichlorohydrin (containing diaminodiphenylmethane as curing agent), which had been precured by heating to 170°C (10 minutes), was overlaid on both sides with a 100µ thick foil of a polyester (based on 80 mole percent 2,2-bis-[3,5-dichloro-4-hydroxyphenyl] propane and 20 mole percent tetrachlorohydroquinone; terephthaloyl dichloride and isophthaloyl dichloride, ratio 1:1). The laminate so formed was pressed for 120 minutes in a press at 170°C and 80 kiloponds/cm², (1 kp = 9.81 kg) the epoxy resin thus being fully cured. Through an inserted iron molding frame, a thickness of the formed plates of 1.8 mm was obtained. Because of its polyester exterior surfaces, the plate exhibited outstanding characteristics. It was soil-repellent and chemically stable. Because of its good electrical properties it also lent itself use in the electrical field.

Table 1 gives examples of the composition of other polyesters suitable for the practice of the invention. The starting materials and the amounts used in the synthesis are specified. The mole percent refer to the total amount of the acid dichlorides or to the total amount of the dihydric phenols.

TABLE 1

| Example number | Mole, percent Terephthalic acid dichloride | Isophthalic acid dichloride | Halogenated dihydric phenol Type | Mole, percent | Halogen-free dihydric phenol Type | Mole, percent |
|---|---|---|---|---|---|---|
| 8 | 100 | | 2,2-bis-(3,5-di-chlor-4-hydroxyphenyl)propane | 100 | | |
| 9 | 100 | | do | 80 | 2,2-bis-(4-hydroxyphenyl)propane | 20 |
| 10 | 100 | | do | 70 | do | 30 |
| 11 | 100 | | do | 60 | do | 40 |
| 12 | 100 | | do | 50 | do | 50 |
| 13 | 100 | | do | 80 | p,p-diphenol | 20 |
| 14 | 100 | | do | 70 | do | 30 |
| 15 | 100 | | do | 60 | Phenolphthalein | 40 |
| 16 | 100 | | Tetrachlordiphenylolsulfone | 100 | | |
| 17 | 100 | | do | 50 | 2,2-bis-(4-hydroxy-phenyl)-propane | 50 |
| 18 | 80 | 20 | 2,2-bis-(3,5-di-chlor-4-hydroxyphenyl)-propane | 100 | | |
| 19 | 80 | 20 | do | 80 | 2,2-bis-(4-hydroxyphenyl)-propane | 20 |
| 20 | 70 | 25 | do | 100 | | |
| 21 | 75 | 25 | do | 80 | 2,2-bis-(4-hydroxyphenyl)-propane | 20 |
| 22 | 100 | | {Tetrachlorhydroquinone / do | 70 / 15 | do | 15 |
| 23 | 100 | | {2,2-bis(3,5-di-chlor-4-hydroxyphenyl)propane / 2,2-bis-(3-chlor-4-hydroxyphenyl)-propane | 70 / 10 | do | 20 |
| 24 | 100 | | {2,2-bis-(3,5-di-chlor-4-hydroxyphenyl)-propane / 2,2-bis-(3-chlor-4-hydroxyphenyl)-propane | 60 / 20 | 2,2-bis-(4-hydroxyphenyl)-propane | 20 |
| 25 | 100 | | {2,2-bis-(4,5-di-chlro-4-hydrosyphenyl)-propane / 2,2-bis-(3-chlor-4-hydroxyphenyl)-propane | 60 / 20 | 4,4'-dihydroxydiphenylsulfone | 20 |
| 26 | 100 | | 2,2-bis-(3,5-di-chlor-4-yhdroxyphenyl)-propane | 70 | {do / 2,2-bis-(4-hydroxyphenyl)-propane | 20 / 10 |
| 27 | 100 | | 2,2-bis-(3,5-di-chlor-4-hydroxyphenyl)-propane | 60 | {2,2-bis-(4-hydroxyphenyl)-sulfone / 4,4'-diphenol | 35 / 5 |
| 28 | 100 | | 2,2-bis-(3,5-di-chlor-4-hydroxyphenyl)-propane | 65 | {2,2-bis-(4-hydroxyphenyl)-propane / 2,2-bis-(3,5-di-brom-4-hydroxyphenyl)-propane | 30 / 5 |

Listed in Table 2 are the properties of the polyesters in accordance with Table 1.

TABLE 2

| Ex. No. | Reduced Viscosity (0.5 weight % solution in Chloroform at 25°C) | Melting range °C Capillary Method | Solubility in chlorinated hydrocarbons |
|---|---|---|---|
| 8 | — | — | insoluble |
| 9 | — | — | insoluble |
| 10 | 1.57 | 330–355 | soluble |
| 11 | 1.55 | 320–350 | soluble |
| 12 | 0.95 | 315–335 | soluble |
| 13 | 0.92 | 310–340 | soluble |
| 14 | 1.15 | 320–350 | soluble |
| 15 | 1.12 | 315–340 | soluble |
| 16 | — | — | insoluble |
| 17 | 0.75 | 300–350 | soluble (up to 5%) |
| 18 | — | — | insoluble |
| 19 | 0.96 | 305–335 | soluble |
| 20 | — | — | slightly soluble |
| 21 | 1.1 | 310–340 | soluble |
| 22 | 1.1 | 330–365 | soluble |
| 23 | 1.25 | 325–360 | soluble |
| 24 | 0.9 | 325–355 | soluble |
| 25 | 1.14 | 315–350 | soluble |
| 26 | 0.9 | 310–340 | soluble |
| 27 | 1.27 | 325–360 | soluble |
| 28 | 0.94 | 330–365 | soluble |

It will be appreciated that the instant specification and examples are set forth by way of illustration and not limitation and that various modifications and changes may be made without departing from the spirit and scope of the present invention.

What is claimed is:

1. The process which comprises coating a body of synthetic resinous material with a polyester of a dicarboxylic acid and of a halogenated dihydric phenol, whereby the chemical and thermal stabilities and the fire resistance of said body are improved.

2. The process according to claim 1, wherein said polyester is of a dicarboxylic acid and a mixture of a halogenated dihydric phenol and a halogen-free dihydric phenol, said halogenated dihydric phenol comprising at least about 50 mole % of said mixture.

3. The process according to claim 1, wherein coating of said body of synthetic resinous material is effected with a solution of said polyester in a volatile solvent, the solvent thereafter being evaporated.

4. The process according to claim 1, wherein said body of synthetic resinous material is a crude pre-form and is coated by application thereabout of a sheet of said polyester, said enveloped body thereafter being formed into final shape with heat and pressure.

5. The process according to claim 4, including providing an epoxy resin adhesive or a polyurethane adhesive between said body of synthetic resinous material and said polyester sheet to improve adhesion therebetween.

6. The process according to claim 1, wherein said dicarboxylic acid is an aromatic dicarboxylic acid.

7. The process according to claim 6, wherein said aromatic dicarboxylic acid is a phthalic acid of which at least about 75 mole percent is terephthalic acid.

8. The process according to claim 7, wherein said polyester is of a dicarboxylic acid and a mixture of a halogenated dihydric phenol and a halogen-free dihydric phenol, said halogenated dihydric phenol comprising at least about 70 mole percent of said mixture, said body of synthetic resinous material being a crude pre-form, said enveloped body thereafter being formed into final shape with heat and pressure and then being cured.

9. A coated shaped body of synthetic resinous material of improved chemical and thermal stabilities and improved fire resistance produced by the process of claim 1.

10. A coated shaped body of synthetic resinous material of improved chemical and thermal stabilities and improved fire resistance produced by the process of claim 8, said synthetic resinous material comprising a polyamide, polycarbonate, polyvinylchloride, polystyrene or polyester.

* * * * *